United States Patent Office 3,298,968
Patented Jan. 17, 1967

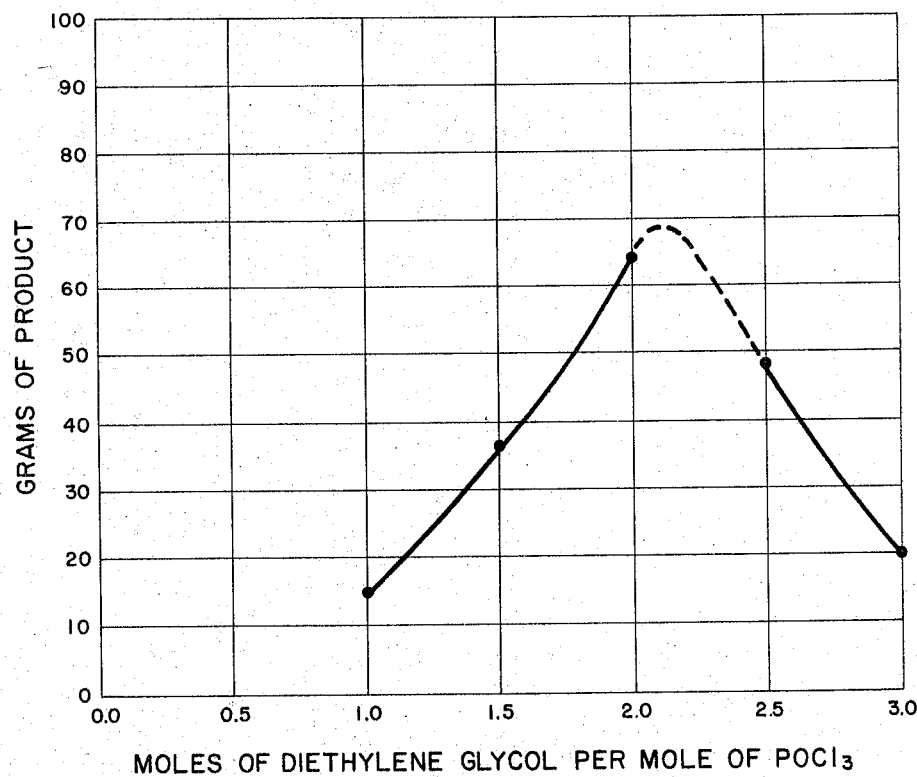

3,298,968
PREPARATION OF ORGANOPHOSPHORUS POLYMERS BY REACTING A PHOSPHORUS OXYHALIDE WITH A GLYCOL
William L. Fierce, Crystal Lake, Ill., assignor, by mesne assignments, to Union Oil Company of California, Los Angeles, Calif., a corporation of California
Filed Dec. 12, 1963, Ser. No. 330,083
9 Claims. (Cl. 260—2)

This invention relates to an improved method for preparing rubber-like polymers by the reaction of a phosphorus oxyhalide and straight-chain glycols of molecular weight between 100 and 2000 having terminal hydroxyl groups.

The preparation of phosphate esters is well known in the art. Phosphate esters are usually prepared by reaction of an alcohol with phosphorus oxychloride ($POCl_3$), usually in the presence of a basic catalyst such as pyridine. The reaction of phosphorus oxychloride with alkylene oxide polymers and with very high molecular weight polyethylene glycols is also known. Harman and Vaughn in U.S. Patent 2,536,685 report the reaction of alkylene oxide polymers with $PCl_3$ or $POCl_3$ at about 170° C. to produce liquids containing phosphorus and chlorine, which could be used as lubricants. Livengood in U.S. Patent 2,567,076 reports the reaction of $POCl_3$ with polyethylene glycols having an average molecular weight of more than 4,000, to produce waxy solids which are water-soluble. Smith and Knoth disclose in U.S. Patent 2,632,767 that complex phosphate esters which are suitable for use as synthetic lubricants can be prepared by reacting two molecular proportions of phophorus oxychloride with one molecular proportion of a glycol and reacting the partial ester thus formed with four molecular proportions of a monohydric alcohol. Experimental work has shown that ethylene glycol and 1,2-propylene glycol react with phosphorus oxychloride to produce water-soluble liquids. Poly-1,2-propylene glycols, having average molecular weights of about 425 and 1025, respectively, react with phosphorus oxychloride to give viscous, ether-soluble liquids.

It is reported in U.S. Patent 3,013,991 that rubbery organophosphorus polymers are prepared by reacting a phosphorus oxyhalide in a 1:3 mol ratio with an aliphatic straight-chain glycol, having terminal hydroxyl groups and a molecular weight less than about 2000, in a non-aqueous, inert solvent at −10° to +20° C. Based upon elemental analysis of the organophosphorus polymer produced by the reaction of phosphorus oxychloride and diethylene glycol, as for example, the polymer is probably a cross-linked phosphate having a structure similar to that indicated below:

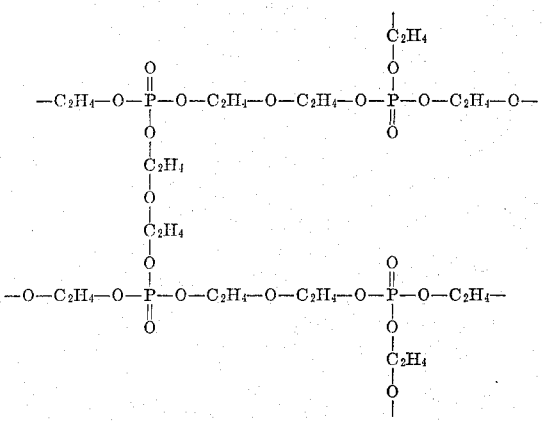

The rubber solids produced in accordance with the process described in U.S. Patent 3,013,991 are very inert, are insoluble in solvents such as water, dilute acids, ketones, ethers, alcohols and hydrocarbons, and melt, with decomposition, above 200° C.

This invention is based on the discovery that the organophosphorus polymers of U.S. Patent 3,013,991 are prepared appreciably increased yields by combining the reactants so that the aliphatic straight-chain glycol is added to the phosphorus oxyhalide and using an excess of the aliphatic straight-chain glycol is added to the phosphorus oxyhalide and using an excess of the aliphatic straight-chain glycol in a glycol:phosphorus oxyhalide mol ratio of less than 3:1.

It is therefore the primary object of this invention to provide an improved method for preparing rubbery organophosphorus polymers. Another object of this invention is to provide a method for preparing rubbery organophosphorus polymers wherein the method of combining the reactants and mol ratios of the reactants are critical. Other objects of this invention will become apparent from time to time throughout the specification and claims as hereinafter related.

In accordance with this invention, appreciably increased yields of the organophosphorus polymers are obtained by reacting a phosphorus oxyhalide with an aliphatic straight-chain glycol, having terminal hydroxyl groups and a molecular weight less than about 2000, in a mol ratio of about 1:1.5 to 1:2.5 at about −10° to +20° C. in a non-aqueous inert solvent, the aliphatic straight-chain glycol being added to the phosphorus oxyhalide. Reaction temperatures from about 0° to +10° C. are preferred.

In the process of making these rubbery polymers, any phosphorus oxyhalide, such as phosphorus oxybromide or phosphorus oxychloride, may be used, although the chloride is preferred.

The reactant glycols which are included in the term "aliphatic straight-chain glycols" are the straight-chain α,ω-alkanediols[$HO(CH_2)_xOH$], where $x$ is 3 to 24] and condensed straight-chain polymers of straight-chain α,ω-alkanediols, having the general formula

$$HO((CH_2)_xO)_nH$$

where $x$ is a small integer (e.g., 2–12) and $n$ is a small integer (2 or more) dependent upon size of $x$, of a value such that the molecular weight of the compound does not exceed about 2000. Polyethylene glycols are preferred in the production of these rubbery polymers and have the formula $HO(C_2H_4O)_nH$, where $n$ is an integer from about 2 to 45. Polyethylene glycols which may be used include diethylene glycol, triethylene glycol, tetraethylene glycol, pentaethylene glycol, and all other glycols of the general formula given, including mixtures thereof in all proportions. Alkanediols which may be used include α,ω-$C_3$-$C_{24}$ straight-chain alkanediols, such as trimethylene glycol, tetramethylene glycol, pentamethylene glycol, hexamethylene glycol, decamethylene glycol, pentadecamethylene glycol, and 1,20-eicosanediol.

The reaction is preferably carried out in an inert non-aqueous solvent (inert toward the reactants and reaction products) such as dimethyl ether, diethyl ether, carbon tetrachloride, trichloroethylene, toluene, hexane, or dimethyl phthalate. The reaction proceeds best in the presence of an amine (HCl acceptor) such as pyridine, quinoline, a dialkylaniline, e.g., N,N-dimethylaniline, N-methyl-N-ethylaniline, N,N-diethylaniline, N-methyl-N-propylaniline, etc., or a trialkylamine, e.g., trimethylamine, triethylamine, tributylamine, N,N-diethylmethylamine, N-ethyl-N-methylpropylamine, etc. The amine is used in an amount sufficient to combine with the by-product HCl expected to be produced in the reaction. A slight excess of the amine is preferably used. The amine may be added to the phosphorus oxyhalide, the glycol, or even the phosphorus oxyhalide-glycol mixture.

The following non-limiting examples are illustrative of the process of this invention.

EXAMPLE I

A round-bottom flask equipped with a condenser, thermometer, stirrer, dropping funnel and a cooling bath was charged with 51.1 grams (⅓ mol) of phosphorus oxychloride dissolved in 500 ml. of anhydrous ether. The dropping funnel was charged with 70.8 grams (⅔ mol) of diethylene glycol dissolved in 75 ml. of anhydrous ether. Eighty-five ml. (1.05 mol) of pyridine was added to the solution in the dropping funnel. After the contents of the flask were cooled to 10° C., the mixture in the dropping funnel was slowly added with stirring. The temperature was held near 10° C. and the addition time was about two hours. The reaction mixture was then allowed to warm to room temperature. A white, somewhat granular, solid product precipitated from the solution and was removed by filtration. The product was washed with dilute HCl and water, dried, and weighed. The yield of the product was 64.7 grams. This product was rubbery and insoluble or substantially insoluble in common solvents such as water, dilute acid, acetone, ether, toluene, n-heptene, xylene, methyl isobutyl ketone, tetrahydrofuran, ethylacetate, carbon disulfide, acetonitrile, 2-ethoxyethanol, dimethylsulfoxide, 2-propanol, furfural, and dimethylformamide. The product was almost completely dissolved by 5.0 N sodium hydroxide. The rubbery nature of this product, together with its lack of solubility in a known solvent, made it practically impossible to determine the molecular structure. Because of the lack of solubility, and the rubbery character of the product, it was presumed to be of polymeric nature. The product was further characterized by a melting point (with decomposition) of about 250° C. The elemental analysis of this product was carbon 34.4%, hydrogen 6.3%, chlorine 1.1%, and phosphorus 11.1%. This analysis does not correspond to any simple compound which could be produced by this reaction, and is believed to further substantiate the presumed polymeric nature of the product.

Four more runs were conducted in the identical manner described above except for the variation in the amount of diethylene glycol used. The results of these experiments are set forth in Table I and are graphically presented in the accompanying drawing.

TABLE I

| Run | Amounts of Reactants Used | | | | Amount of Pyridine Used | | Glycol/POCl₃ Mol Ratio | Polymer Yield, Grams |
|---|---|---|---|---|---|---|---|---|
| | Diethylene Glycol | | Phosphorous Oxychloride | | | | | |
| | Grams | Mols | Grams | Mols | Ml. | Mols | | |
| 2 | 35.4 | ⅓ | 51.1 | ⅓ | 85 | 1.05 | 1.0/1.0 | 15.4 |
| 3 | 53.1 | ½ | 51.1 | ⅓ | 85 | 1.05 | 1.5/1.0 | 36.4 |
| 4 | 88.4 | ⅚ | 51.1 | ⅓ | 85 | 1.05 | 2.5/1.0 | 48.3 |
| 5 | 106.1 | 1 | 51.1 | ⅓ | 85 | 1.05 | 3.0/1.0 | 20.0 |

From these data it is seen that the polymer yield varied appreciably as different diethlyene glycol:phosphorus oxychloride mol ratios were utilized, with the maximum yield being obtained when a diethylene glycol:phosphorus oxychloride mol ratio of about 2:1 was used, as described in the first run. When the polymer yield is plotted against diethylene glycol:phosphorus oxychloride mol ratio, as shown in the accompanying drawing, it appears as if the maximum polymer yield is obtained when a diethylene glycol:phosphorus oxychloride mol ratio within the range of about 2.0:1 to 2.25:1 is used. Although the exact peak of the curve (as represented by the dashed portion) is unknown, it would appear from the data that the maximum yield is obtained by using mol ratios within this range. In any event, it will be apparent that the polymer yield is appreciably greater when a diethylene glycol:phosphorus oxychloride mol ratio within the range of about 1.5:1 to 2.5:1 is used rather than 3:1.

EXAMPLE II

In another experiment a reaction was carried out in the identical manner described in Example I except that 51.1 grams (⅓ mol) of phosphorus oxychloride dissolved in 75 ml. of anhydrous ether was added to a mixture of 85 ml. of pyridine and 106.1 grams (1.0 mol) of diethylene glycol dissolved in 250 ml. of anhydrous ether. The white, rubbery product which was obtained had a melting point (with decomposition) of 275° C. and an elemental analysis of 35.1% carbon, 6.5% hydrogen, 0.6% chlorine, and 8.8% phosphorus. This product which was apparently the same as the products of Example I, was obtained in a yield of 7.8 grams, demonstrating the reduced yields which are obtained when the order of adding the reactants is reversed.

EXAMPLE III

In still another experiment a reaction was carried out in the identical manner described in the first run of Example I except that the reaction temperature was held near 25° C. A white rubber-like solid which was apparently the same as the products of Example I was obtained in a yield of 22.2 grams. The solid had a melting point (with decomposition) of 220°–250° C. This experiment clearly points out the reduced product yields which are obtained when temperatures higher than the preferred temperatures are used.

EXAMPLE IV

When phosphorus oxychloride and diethylene glycol are reacted as outlined for the first run of Example I, except that Chlorothene (1,1,1-trichloroethane) was used as a solvent, a polymer formed, but it could not be easily isolated since it formed a stable gel when water-washed.

EXAMPLE V

When phosphorus oxybromide and diethylene glycol are reacted in the manner outlined for the first run of Example I, a rubber-like polymer having properties similar to the products of Example I is obtained.

EXAMPLE VI

When the procedure outlined for the first run of Example I is repeated, using triethylene glycol in the same molar ratio as the diethylene glycol of Example I, a white rubbery solid having properties similar to the products of Example I is obtained.

EXAMPLE VII

Several experiments were run in which a mixture of polyethylene glycol 400 dissolved in anhydrous ether and pyridine were slowly added to phosphorus oxychloride dissolved in anhydrous ether. Polyethylene glycol 400 is a commercial product obtained from Union Carbide Chemicals Company, and is a mixture of polyethylene glycols having an average molecular weight of about 400 and containing polyethylene glycols ranging from tetraethylene glycol up to pentadecaethylene glycol, with octaethylene glycol, nonaethylene glycol, decaethylene glycol, hendecaethylene glycol, and dodecaethylene glycol predominating. Glycol: phosphorus oxychloride, mol ratios ranging from 1:1 to 2:1 and reaction temperatures ranging from 10° to 25° C. were used in these runs. In each run a solid product formed which gelled in contact with water and could not be washed and purified.

The rubber-like organophosphorus polymers produced in this invention have a variety of uses. These materials, because of their chemical inertness and lack of solubility in common solvents, may be used as fillers, packings, and absorbents for chemical reactors. These products in granulated form may be used as filter-aids for filter presses. The elasticity and high chemical and thermal stability of these polymers make it possible to substitute them for rubber and other elastic polymers for padding in upholstered furniture. These products may be finely granulated and incorporated in a paint base as a fire-retardant filler.

The embodiments of the invention in which an exclusive property or privilege is claimed are defined as follows:

1. In a process of preparing rubbery organophosphorus polymers by reacting a phosphorus oxyhalide with a glycol in the presence of an amine, selected from the group consisting of pyridine, quinoline, dialkylanilines and trialkylamines, in an inert, non-aqueous solvent at a temperature of about $-10°$ C. to $+20°$ C., said glycol being selected from the group consisting of polyethylene glycols of the formula $HO(C_2H_4O)_nH$, where $n$ is 2 to 45, and $\alpha,\omega$-$C_3$-$C_{24}$ straight-chain alkanediols, and recovering as a solid precipitate the reaction product consisting of a rubbery solid characterized by its insolubility in water, dilute acids, ketones, ether, alcohols, and hydrocarbons, and melting, with decomposition, at a temperature above 200° C., the improvement which comprises gradually adding said glycol to said phosphorus oxyhalide in the order indicated over an extended period and using a glycol:phosphorus oxyhalide mol ratio within the range of about 1.5:1 to 2.5:1.

2. A process according to claim 1 in which the phosphorus oxyhalide is phosphorus oxybromide.

3. A process according to claim 1 in which the glycol is a polyethylene glycol.

4. A process according to claim 1 in which the glycol is triethylene glycol.

5. A process according to claim 1 in which the phosphorus oxyhalide is phosphorus oxychloride.

6. A process according to claim 5 in which the glycol is diethylene glycol.

7. A process according to claim 6 in which the phosphorus oxychloride and diethylene glycol are reacted in the presence of pyridine.

8. A process according to claim 7 in which a glycol: phosphorus oxychloride mol ratio in the range of about 2.0:1 to 2.25:1 is used.

9. A process according to claim 8 in which a glycol: phosphorus oxychloride mol ratio of about 2.0:1 is used.

References Cited by the Examiner
UNITED STATES PATENTS

| 2,567,076 | 9/1951 | Livengood | 260—75 |
| 3,013,991 | 12/1961 | Fierce et al. | 260—2 |

SAMUEL H. BLECH, *Primary Examiner.*